United States Patent [19]
Miyauchi

[11] 3,895,542
[45] July 22, 1975

[54] SHIFT POINT STABILIZING HYDRAULIC CONTROL CIRCUIT FOR AUTOMATIC TRANSMISSION

[75] Inventor: Toshiyuki Miyauchi, Yokohama, Japan

[73] Assignee: Nissan Jidosha Kabushiki Kaisha, Yokohama, Japan

[22] Filed: Oct. 3, 1973

[21] Appl. No.: 403,305

[30] Foreign Application Priority Data
Oct. 6, 1972  Japan .............................. 47-100494

[52] U.S. Cl. ...................... 74/868; 74/867; 74/869
[51] Int. Cl. ........................................ B60k 21/02
[58] Field of Search ...................... 74/867, 868, 869

[56] References Cited
UNITED STATES PATENTS

| | | |
|---|---|---|
| 3,142,999 | 8/1964 | Searles et al. .......................... 74/868 |
| 3,398,607 | 8/1968 | Chana ................................ 74/868 X |
| 3,646,836 | 3/1972 | Kubo et al. .......................... 74/868 X |
| 3,691,872 | 9/1972 | Schaefer et al. .................... 74/869 X |

*Primary Examiner*—Samuel Scott
*Assistant Examiner*—P. S. Lall
*Attorney, Agent, or Firm*—Sughrue, Rothwell, Mion, Zinn & Macpeak

[57] ABSTRACT

A hydraulic control circuit for an automatic transmission is disclosed which utilizes two pressure regulating valves in series to regulate the hydraulic pressure supplied to the shift control valves from a main pump. The output of the second valve is controlled by a signal pressure which may vary with the vehicle throttle opening. Since the output of the second valve may be directly controlled, the output pressure can be selected to avoid shift point fluctuation.

8 Claims, 10 Drawing Figures

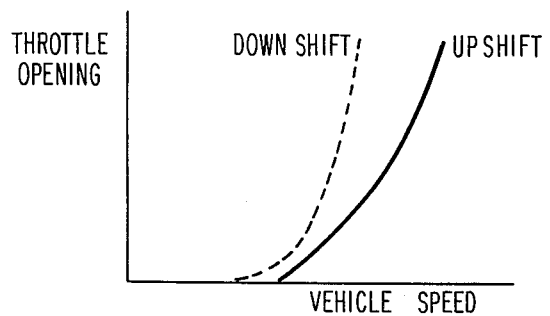
FIG.1
FIG.2
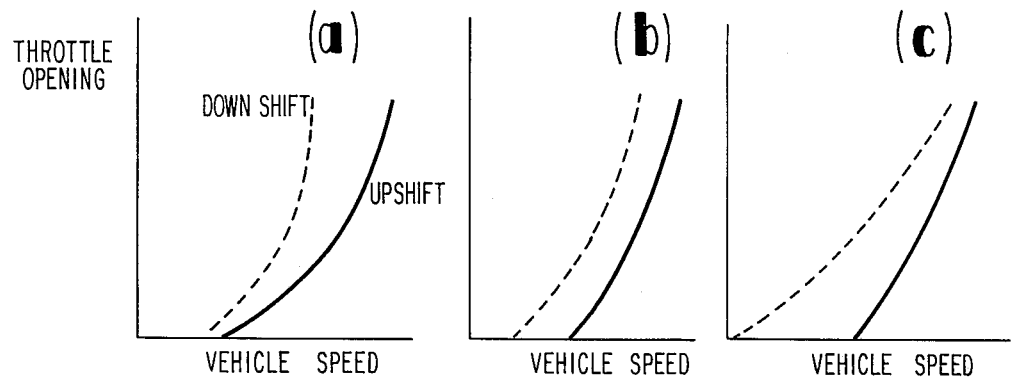
FIG.3
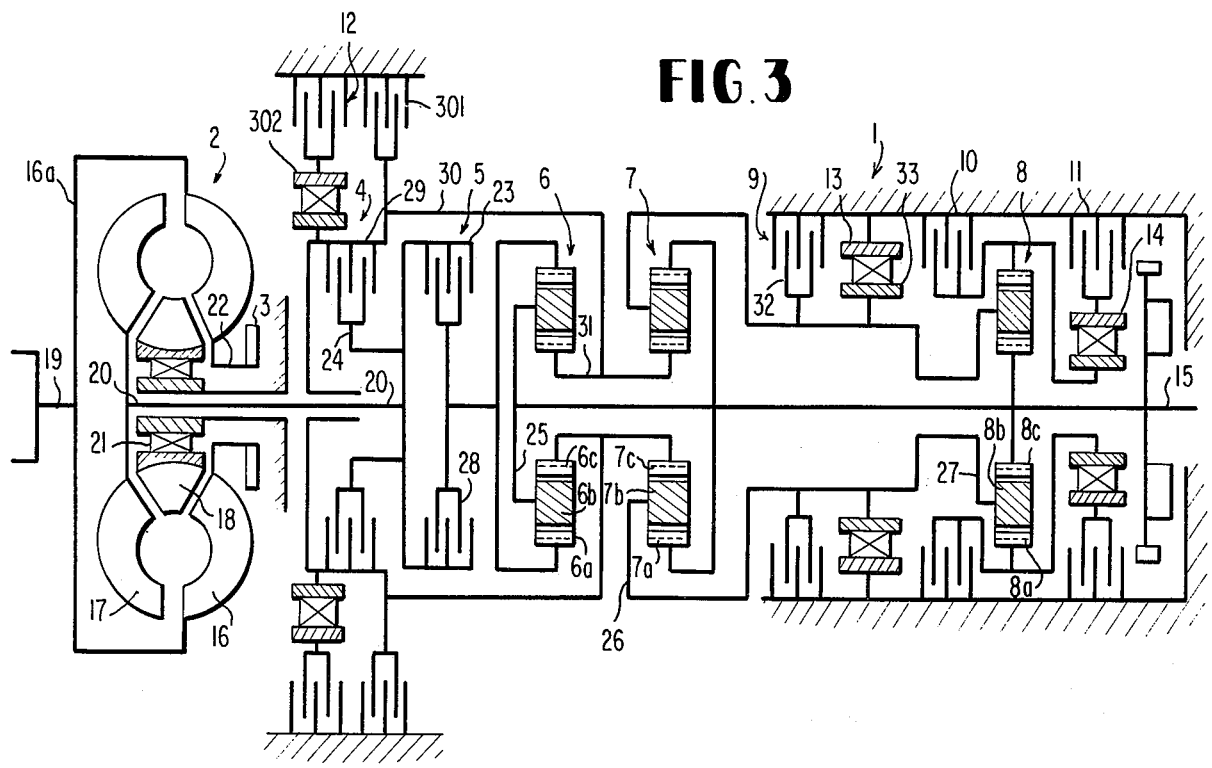

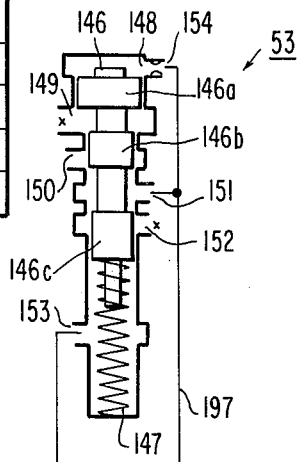
FIG.4a
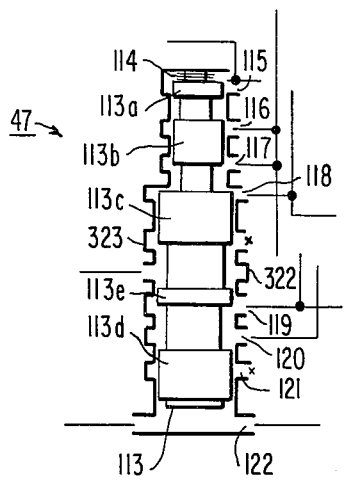
FIG.4b
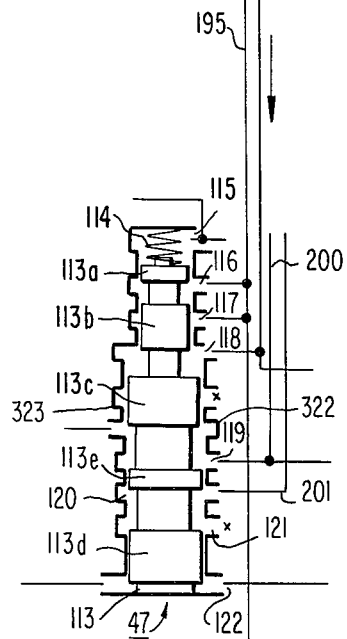
FIG.5a
FIG.5b
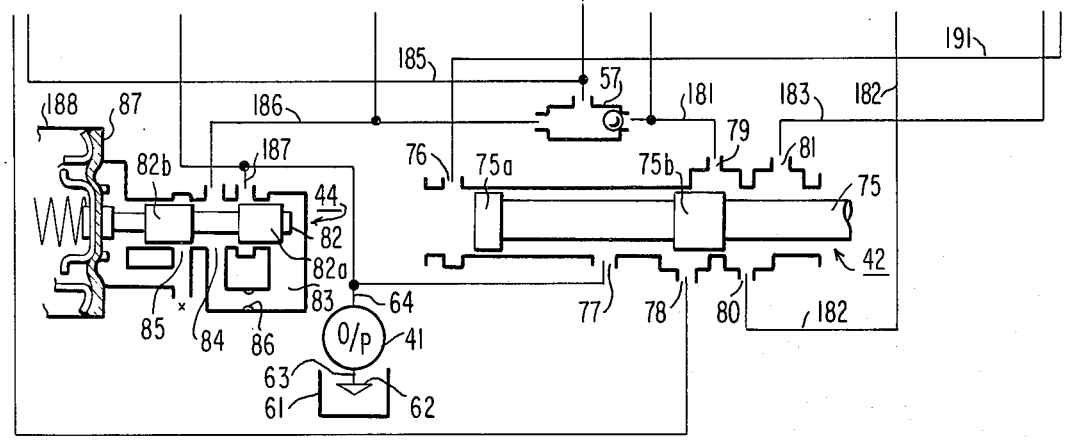

SHIFT POINT STABILIZING HYDRAULIC CONTROL CIRCUIT FOR AUTOMATIC TRANSMISSION

BACKGROUND OF THE INVENTION

In a conventional automatic transmssion, a main pump supplies fluid at line pressure to the shift control valves. The valves, usually of the spool type, direct the fluid to various frictional elements, such as clutches or brakes, to cause engagement or disengagement of such elements. The line pressure is applied to the control valves in opposition to a governor pressure which varies directly with the vehicle speed. Thus, the transmission can only shift into the next high gear when the force by the governor pressure exceeds the force by the line pressure.

Conventionally, a single valve is used to regulate the line pressure supplied to the shift valves. such line pressure is not maintained at a stable level, but varies with the flow rate of the pump discharge which depends upon the speed of the pump. Also, the line presssure varies when the frictional elements are actuated and when the throttle setting is varied. The varation of shift points as a function of throttle opening is shown in FIG. 1. In such a conventional transmission, the hysteresis between upshift and downshift is not controllable.

The line pressure fluctuation causes the shift point, i.e., that point where the force by the governor pressure exceeds the force by the line pressure, to fluctuate. Since the conventional line pressure regulating valve must regulate a relatively large flow rate from the main pump, its pressure stability is poor and it cannot, therefore, eliminate the undesirable shift point fluctation.

SUMMARY OF THE INVENTION

The present invention alleviates the aforementioned problem of shift point fluctuation by inserting a second pressure regulating valve in the hydraulic circuit between the first regulating valve and the shift control valves. The second valve further regulates the output of the first regulating valve to more accurately control the pressure supplied to the shift valves and thereby prevent the undesirable shift point fluctuation. Since the second valve deals with a smaller flow rate than that of the first valve, it may regulate the line pressure more accurately. The second regulating valve may be controlled by a signal from the throttle opening such that the output pressure will vary directly or inversely with the throttle opening, or it may supply a constant output pressure regardless of throttle opening. The variation of shirt points as a function of throttle opening as shown in FIG. 2A-2C respectively.

BRIEF DESCRIPTION OF THE DRAWINGS

FIG. 1 shows a graph of the shift point as a function of throttle opening and vehicle speed of a conventional automatic transmission hydraulic control circuit.

FIG. 2A is a graph of the shift point as a function of throttle opening and vehicle speed of a control circuit of the present invention wherein the shift valve actuating pressure is directly proportional to the throttle opening.

FIG. 2B is a graph of the shift point as a function of throttle opening and vehicle speed of a control circuit of the present invention wherein the shift valve actuating pressure is constant.

FIG. 2C is a graph of the shift point as a function of throttle opening and vehicle speed of a control circuit of the present invention wherein the shift valve actuating pressure is inversely proportional to the throttle opening.

FIG. 3 shows an example of an automatic transmission to which the hydraulic control circuit of the present invention can be applied.

FIG. 4a shows an operational chart indicating which clutch or brake is engaged for each gear range.

FIG. 4b shows an operational chart indicating which ports of the manual shift valve are open for each gear range.

FIG. 5a shows a detailed view of selected parts of the hydraulic control circuit of FIG. 4 showing shift valve 47 in its lower position.

FIG. 5b shows shift valve 47 in its upper position.

DETAILED DESCRIPTION OF THE PREFERRED EMBODIMENT

Figure 4:
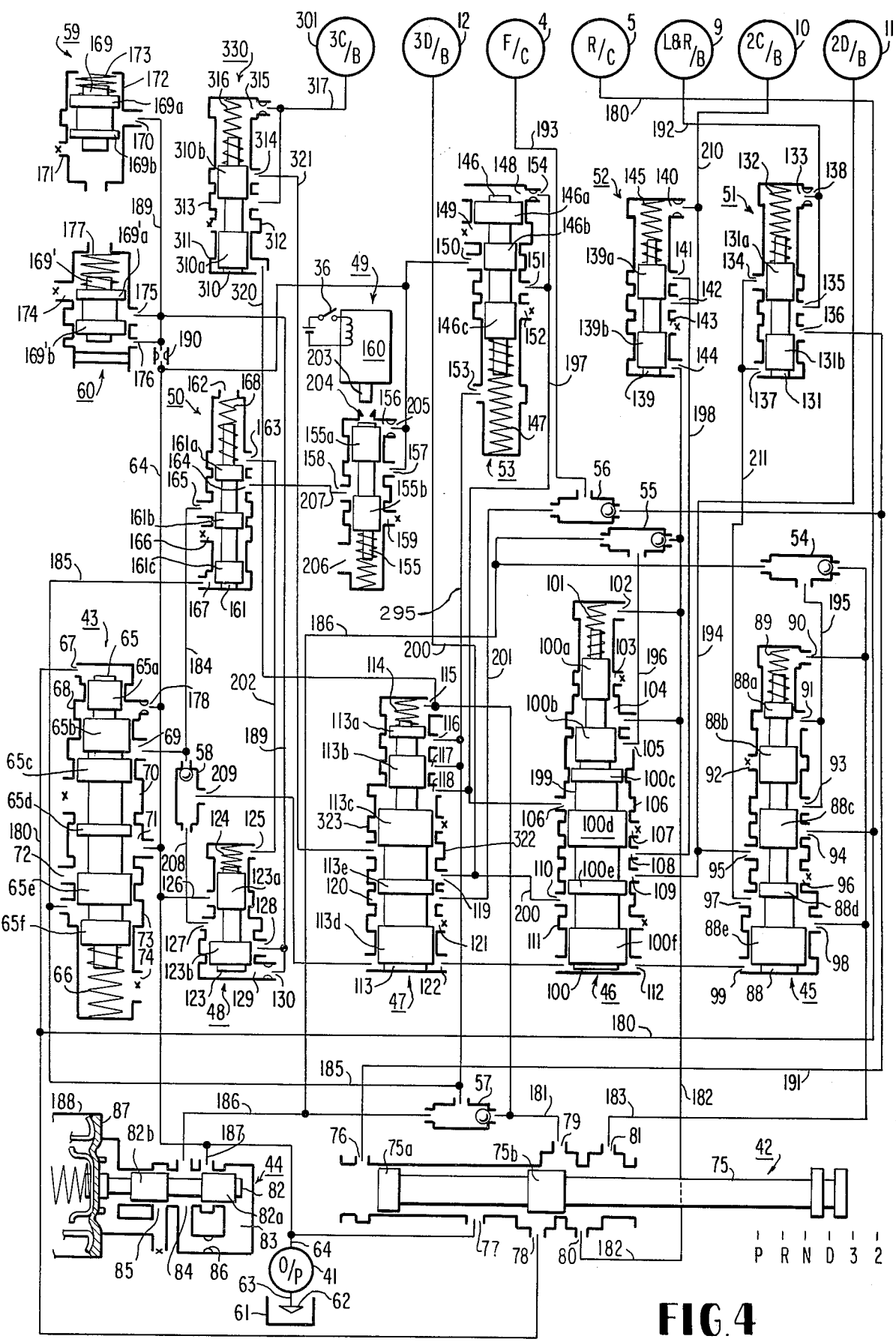
FIG. 4 shows the hydraulic control circuit for an automatic transmission utilizing the present invention.

The present invention will now be described in detail by referring to accompanying drawings. FIG. 3 shows an example of automatic transmission to which the hydraulic control circuit of the present invention can be applied. The gear train of the automatic transmission of FIG. 3 provides four different forward speed ratios and one reverse speed ratio. It should be understood that the application of the present invention is not restricted only to such automatic tranmission, but it can be used together with a three-speed, five-speed, or other types of automatic transmission.

The transmission includes a casing 1 and comprises a torque converter 2, an oil pump 3, a front clutch 4, a rear clutch 5, a first planetary set 6, a second planetary set 7, a third planetary set 8, a low-and-reverse brake 9 (to be referred to as LRB, hereinafter), a second coasting brake 10 (to be referred to as 2CB, hereinafter), a second driving brake 11 (to be referred to as 2DB, hereinafter), a third driving brake 12 (to be referred to as 3DB, hereinafter) a third coasting brake 301 (to be referred to as 3CB, hereinafter), a low one-way brake 13, a second one-way brake 14, a third one-way brake 302, and an output shaft 15, which are all housed in the casing 1. The torque coverter 2 includes a pump impeller 16, a turbine runner 17, and a stator 18. The pump impeller 16 is driven by an engine crankshaft 19 through a drive plate 16a. The turbine runner 17 is splined to an input shaft 20. The stator 18 is supported by a one-eay brake 21 and rotatable only in the same direction as the impeller 16. The pump impeller 16 has a shaft 22 which drives the oil pump 3. The input shaft 20 is coupled to a rear clutch drum 23 and an inner hub 24 of the front clutch 4. The planetary sets 6, 7, and 8 include ring gears 6a, 7a, 8a, planet gears 6b, 7b, sun gears 6c, 7c, 8c, and carriers 25, 26, 27, respectively. The rear clutch has an inner hub 29 which is connected to the ring gear 6a of the first planetary set. The front clutch drum 29 is coupled to a connector shaft 31 which connector shaft 31 is connected to the sun gears 6c and 7c of the first and second planetary sets 6 and 7. The carrier 25 carrying the planet gears 6b of the first planetary set 6 is connected to the output shaft 15. The output shaft 15 is also connected to the ring gear 7a of the second planetary set 7 and the sun gear 8c of the third planetary set 8. The carrier 26 carrying the planet gears 7b of the second planetary set 7 is connected to the carrier 27 carrying the planet gears 8b of the third planetary set 8, through the inner hub 32 of the low-and-reverse brake 9 and the inner face 33 of the low one-way brake 13. The ring gear 8a of the third planetary set 8 is disposed in such a manner that the ring gear 8a can be held stationary by the second coasting brake 10 and by the second driving brake 11 through the second one-way brake 14.

Table 1 and FIG. 4a show schedules for achieving four different forward speed ratios and one reverse speed ratio by selectively actuating the front clutch 4, the rear clutch 5 the third driving brake 12, the third coasting brake 301, the low-and-reverse brake 9, the second coasting brake 10, the second DB 11, the low one-way brake 13, the second one-way brake 14, and the third one-way brake 302. The speed change ratio in Table 1 is based on 80 teeth for the ring gear and 37 teeth for the sun gear, for all of the first, second, and third planetary sets. The speed change ratio, of course, can be modified by suitably changing such number of teeth in different gears of the different planetary sets.

In Table 1, and FIG. 4a the circle (o) indicates that the hydraulic pressure is applied to the circled friction elements or brakes, while in Table 1 the triangle (Δ) indicates that the thus marked one-way brake is applied.

Referring to Table 1, the difference of the $D_1$ and $D_2$ ranges of the category from the "1" and "2" ranges is whether the brake is applied in one-way or two-ways. More particularly, both the low one-way brake 13 and the second one-way brake 14 produce reactive forces when they are driven from the engine side, but they idle when being driven from the output shaft 15. Accordingly, in $D_1$, $D_2$ and $D_3$ ranges with the one-way brakes applied, the engine brake is not effective. When it is desired to effect the engine brake, the low-and-reverse brake 9, the second coasting brake 10, and the third coasting brake 301 must be applied. In operation, the rear clutch 5 and the one-way brake 13 are applied in the $D_1$ range, while the rear clutch 5 and the low-and-reverse clutch 9 are applied in the 1 range. In the following description, for simplicity, it will be assumed that the shaft 20 is driven by the rotation of the output shaft 15.

When the output shaft 15 rotates, the ring gear 7a of the second planetary set 7 rotates at the same speed with the shaft 15. At this moment, the carrier 26 is held stationary by the low-and-reverse brake 9 or the low one-way brake 13, and the sun gear 7c rotates at a certain speed, and the sun gear 6c of the first planetary set 6 coupled thereto also rotates at the same speed with the sun gear 7c. In this planetary set, the carrier 25 rotates at the same speed with the output shaft 15, so that the ring gear 6a rotates at a speed which depnds on the speeds of the carrier 25 and the sun gear 6c. The rotation of the ring gear 6a is transmitted to the input shaft 20 through the rear clutch 5.

In practice, the driving power from the input shaft 20 is transmitted to the output shaft 15, in the opposite direction to the aforesaid direction but through the same path.

With the $D_2$ range, i.e., the second-speed of the D-range, the rear clutch 5 is engaged and the second driving brake 11 is applied. In the 2 range, the rear clutch 5 is engaged and the second coasting brake 10 is applied. It is assumed that the output shaft 15 drives the transmission, as in the case of the first speed ratio range. As the output shaft 15 rotates, the sun gear 8c of the third planetary set 8 revolves together with the shaft 15, so as to drive the carrier 27 at a certain speed. At this time, the ring gear 8a is held stationary by the second coasting brake 10 or the second one-way brake 14.

In the second planetary set 7, the ring gear 7a is connected to the output shaft 15 and the carrier 26 is connected to the carrier 27 of the third planetary set 8, so that the sun gear 7c revolves at a speed which depends on the speeds of the ring gear 7a connected to the output shaft 15 and the carrier 26. In the first planetary set 6, the carrier 25 is connected to the utput shaft 15 and the sun gear 6c is connected to the sun gear 7c of the second planetary set, the ring gear 6a rotates at a speed which depends on the speeds of the sun gear 6c and the carrier 25. Since this ring gear 6a is connected to the input shaft 20 through the rear clutch 5, the shaft 20 rotates at the same speed with ring gear 6a. In this case, the input shaft 20 actually transmits power to the output shaft 15 in the opposite direction to the aforesaid direction but through the same path.

With $D_3$ range, the rear clutch 5 is engaged and the brake 12 is applied. With the 3 range, the third coasting brake 301 is applied. Accordingly, the rotation of the input shaft 20 is transmitted to the ring gear 6a of the first planetary set 6, through the rear clutch 5. Since the sun gear 6c is held stationary by the brake 301 or by the brake 12 through the third one-way brake 302, the carrier 25 rotates at a certain speed, which carrier rotation is transmitted to the output shaft 15.

In the fourth or $D_4$ range, the rear clutch 5 and the front clutch 4 are both engaged. Accordingly, the ring gear 6a and the sun gear 6c of the first planetary set 6 rotate at the same speed with the input shaft 20. Accordingly, the carrier 25 of this planetary set 6 also rotates at the same speed as the input shaft 20, so that the Table 1

|  | | Front clutch 4 | Rear clutch 5 | 3DB 12 | 3CB 301 | Third one-way brake 302 | L.R.B. 9 | Low one-way brake 13 | 2CB 10 | 2DB 11 | Second one-way brake 14 | Speed change ratio |
|---|---|---|---|---|---|---|---|---|---|---|---|---|
| D range | $D_1$ |  | o |  |  |  |  | Δ |  |  | Δ | 2.46 |
|  | $D_2$ |  | o |  |  |  |  |  |  | o | Δ | 2.00 |
|  | $D_3$ |  | o | o |  | Δ |  |  |  |  |  | 1.46 |
|  | $D_4$ | o | o |  |  |  |  |  |  |  |  | 1.00 |
| "1" range |  |  | o |  |  |  | o |  |  |  |  | 2.46 |
| "2" range |  |  | o |  |  |  |  |  | o |  |  | 2.00 |
| "3" range |  |  | o |  | o |  |  |  |  |  |  | 1.46 |
| Reverse "R" range |  | o |  |  |  |  | o |  |  |  |  | −2.16 | output shaft 15 rotates at the same speed as the input shaft 20.

In the reverse or "R" range, the front clutch 4 is engaged and the low-and-reverse brake 9 is applied. The rotation of the input shaft 20 is transmitted to the sun gear 7c of the second planetary set 7 through the front clutch 4 and the brake drum 30. At this moment, the carrier 26 of the second planetary set 7 is held stationary by the low-and-reverse brake 9, so that its ring gear 7a is rotated at a certain speed in the opposite direction to the sun gear 7c, and the rotation of the ring gear 7a is transmitted to the output shaft 15.

The hydraulic circuit according to the present invention will now be described by referring to FIG. 4. The hydraulic circuit of the present invention comprises a pump 41, a manual valve 42, a regulator valve 43, a throttle valve 44, a 1-2 shift valve 45, a 2-3 shift valve 46, a 3-4 shift valve 47, a downshift valve 48, a solenoid valve 49, an idle valve 50, a 1-speed pressure-reducing valve 51, a 2-speed pressure-reducing valve 52, a 3-speed pressure-reducing valve 330, a hysteresis valve 53, five shuttle valves 54, 55, 56, 57, 58 and two governor valves 59, 60. The pump 41 pumps oil from an oil sump 61 through a strainer 62, an intake conduit 63, and into a line pressure passage 64. The line pressure passage 64 delivers the line pressure to various frictional clutches and brakes.

Hysteresis valve:

The hysteresis valve 53 has a valve spool 146 with lands 146a, 146b, and 146c which is normally urged upwardly, as seen in FIGS. 4 and 5a, by a spring 147. The hysteresis valve 53 also has valve ports 148, 149, 150, 151, 152, and 153. The valve port 150 communicates with the line pressure passage 64, while the valve port 153 communicates with a passage 295.

The aforesaid passage 295 communicates with either the valve port 79 of the manual valve 42 through the shuttle valve 57 or with valve port 84 of the throttle valve 44 through shuttle valve 57. Unless the spool 75 of the manual valve 42 is located at the range or position 1, 2, or 3, the passage 295 communicates with the throttle valve for receiving the throttle pressure. When the manual valve spool 75 is at 1, 2, or 3 range or position, the passage 295 communicates with the port 79 of the manual valve 42 for receiving the line pressure. The oil pressure which is delivered from the port 150 to the port 148 through the valve port 151, the passage 197, and the orifice 154 is regulated to a level which balances a combined upwardly directed force due to both the oil pressure at the port 153 urging the land 146c upwardly and the elasticity of a spring 147.

Unless the spool 75 of the manual valve 42 is at the range or position 3, 2 or 1, the oil pressure at the valve portion 153 is the throttle pressure, so that the oil pressure at the passage 197 varies with the throttle pressure.

When the spool 75 of the manual valve 42 is at the range or position 3, 2, or 1, the oil pressure at the valve port 153 becomes the line pressure, and a force due to this line pressure is combined with the force of the spring 147 in urging the spool 146 upwardly. As a result, the pressure regulating balance is lost, and the ports 150 and 151 communicate with each other, so that the pressure at the passage 197 becomes the line pressure.

Regulator valve:

The valve 43 regulate the pressure in the line pressure passage 64. The regulator valve 43 includes a spool 65 with lands 65a, 65b, 65c, 65d, 65e, 65f, and a spring 66 urging the spool 65 upwardly.

Valve ports 67, 68, 69, 70, 71, 72, 73 and 74 are formed on the regulator valve 43. The valve port 67 of the regulator valve 43 is provided with the line pressure from the manual valve 42 through a passage 180 only during the forward ranges, so that the line pressure is reduced only during the forward ranges, as will be described hereinafter. The valve port 68 of the regulator valve 43 communicates with the line pressure passage 64 through an orifice 178. Accordingly, an oil pressure acts on the differential area between the lands 65a and 65b of the spool 65 of the regulator valve 43, so that there is produced a force which urges the spool downwardly. The valve port 69 of the regulator valve 43 communicates with a valve port 165 of the idle valve 50 through a passage 184. As will be described later, an oil pressure is generated at the port 165 of the idle valve 50 when the car idles. As a result, during the idling, the oil pressure acts on the differential area between the lands 65b and 65c of the spool 65, so as to generate a force which urges the spool 65 downwardly. The port 70 of the regulator valve 43 is a drain port which drains the oil leaking from the port 71 through a gap adjacent the land 65d. The port 71 communicates with the line pressure passage 64. The port 72 of the regulator valve 43 is connected to the torque converter, for feeding the oil to the torque converter from the port 71 through a gap adjacent the land 65e of the spool 65. The port 73 of the regulator valve 43 communicates with the shuttle valve 57 through a passage 185. The shuttle valve 57 communicates with the port 79 of the manual valve 42 through the passage 181, as well as with the port 84 of the throttle valve 44 through the passage 186. The port 79 of the manual valve 42 is at the line pressure when the spool 75 thereof is at the range or position 3, 2, or 1. The port 84 of the throttle valve 44 is at the oil pressure (throttle pressure) which corresponds to the engine load. As well known in the art, the shuttle valve 57 provides the passage 185 with the higher one of the pressures at the passages 181 and 186. As a result, when the manual valve 42 is at the range or position 3, 2 or 1, the passage 185 is at the line pressure.

Thus, the differential area between the lands 65e and 65f of the regulator valve spool 65 is provided with the throttle pressure when the manual valve 42 is not at any one of the ranges or positions 3, 2 and 1, while the differential area is provided with the line pressure when the manual valve 42 is at the range of position 3, 2, or 1. The port 74 of the regulator valve 43 is a drain port.

Throttle valve:

The throttle valve 44 is a valve which produces a pressure corresponding to the engine load, i.e., the throttle pressure, for modifying the shift point of the automatic transmission and for controlling the line pressure applicable to various brakes and clutches. The port 187 of the throttle valve 44 is at the line pressure from the line pressure passage 64, and the port 84 of the valve 44 communicates the other port 83 thereof through an orifice 86. A chamber 188, which is formed to the left of a diaphragm, as seen in FIG. 4, of the throttle valve 44, communicates with an engine intake conduit, so that the valve spool 82 is strongly urged to the right when the engine load is high, while it is weakly urged to the right when the engine load is low.

When the force which urges the spool 82 to the right from the diaphragm 87 is large, the gap from the port 187 to the port 84 increases while decreasing the gap leading to the drain port 85 by the land 82b of the spool 82. Accordingly, the oil pressure at the port 84 increases, and the oil pressure at a port 83 communicating with the port 84 also increases. Thus, the increased pressure at the port 83 acts on the extreme right end of the spool land 82a so as to tend to return the spool 82 to the original position thereof. Consequently, the spool 82 is held at a balanced position, and the oil pressure at the port 84 is regulated at a comparatively high level. On the contrary, when the force from the diaphragm 87 is small, the oil pressure at the port 84 is regulated at a comparatively low level. Such pressure regulation by the throttle valve 44 results in an oil pressure proportional to the engine load (throttle pressure) at the valve port 84.

Governor valves:

The governor valves 59 and 60 generate an oil pressure which corresponds to car speed to facilitate the shifting of the speed change ratios. The primary governor valve 59 includes a casing secured to the output shaft, which casing houses a valve spool 169 and a spring 172. The spool 169 is slidable in the housing. The secondary governor valve 60 also includes a housing secured to the output shaft which houses a spool 169' and a spring 177. The spool 169' is also slidable in the housing. A governor pressure passage 189 is provided with an oil pressure from the line pressure passage 64 through an orifice 190. When the passage diameter of the orifice 190 is sufficiently small, the oil pressure in the passage 189 has very little effect on the pressure in the passage 64.

When the revolving speed of the output shaft is below a certain value (e.g., 500 r.p.m.), the spool 169 of the primary governor valve 59 is urged downwardly by the spring 172, to allow port 170 to communicate with drain port 171, so that the oil in the passage 189 is discharged to the drain port 171. Therefore, no oil pressure is built in the passage 189. As the revolving speed of the output shaft increases, the spool 169 moves upwards, as seen in FIG. 4, due to an increased centrifugal force, so that the port 170 is isolated from the drain port 171 and the oil in the passage 189 is retained therein, to build up an oil pressure which is determined by the secondary governor 60, as will be described hereinafter. In the secondary governor valve 60, an oil pressure delivered through a valve port 176 to the lower surface of the land 169'b of spool 169' balances the elasticity of a spring 177 plus the centrifugal force acting on the spool. When the revolving speed of the output shaft becomes high and the centrifugal force acting on the spool 169' increases, the oil pressure in the passage 189 also increases to balance such increased centrifugal force. In effect, the oil pressure in the passage 189 corresponds to the revolving speed of the output shaft. With the combined effect of the primary governor valve 59 and the secondary governor valve 60, the oil pressure at the passage 189 is zero when the revolving speed of the output shaft is below a certain predetermined level, while for the revolving speed in excess of the predetermined level, the oil pressure at the passage 189 corresponds to the revolving speed of the output shaft, i.e., the car speed (such oil pressure will be referred to as "fundamental governor pressure," hereinafter).

Downshift valve:

The downshift valve 48 includes a spool 123 with lands 123a and 123b a spring 124 urging the spool 123 downwardly, and valve ports 125, 126, 127, 128, and 129. The ports 128 and 129 communicates with the fundamental governor pressure at the passage 189, while the port 126 communicates with the line pressure passage 64. An oil pressure signal is applied to the valve port 125 at the time of kickdown, but otherwise it is drained to the port 162 of the idle valve 50. Except for the time of kickdown, the line pressure from the port 126 enters the port 127 through a gap adjacent the land 123a of the spool 123, so that this pressure acts on the differential area between the lands 123b and 123a for generating a force urging the spool 123 downwardly. The downward force is combined with the elasticity of the spring 124, so as to balance the upward force acting on the land 123b due to the fundamental governor pressure from the port 129. Accordingly, the oil pressure at the port 127 depends on the fundamental governor pressure. Since the former is higher than the latter by an amount related to the differential area of the lands 123a and 123b, the pressure at the port 127 is somewhat amplified as compared with the fundamental governor pressure (the oil pressure of the port 127 will be referred to as "amplified governor pressure," hereinafter). At the time of kickdown, the spool 161 of the idle valve 50 blocks the drain port 162, so that the line pressure is applied to the port 125 through the ports 157–158 of the solenoid valve 49, the ports 164–163 of the idle valve 50, and the passage 202. Thus, the spool 123 of the downshift valve 48 is forced to its lower position, so as to communicate the ports 127 and 128. As a result, the pressure at the port 127 becomes the fundamental governor pressure.

Operation of the other valves will be described for different ranges of the manual valve 42. FIG. 4b shows which ports of the manual valve 42 are open for each of the positions of the valve.

P range:

When the manual valve 42 is set in the P range the port 77 of the manual valve 42 connected to the line pressure passage 64 is blocked by the land 75b of the spool 75, so that no oil pressure is applied to the shift valves. Accordingly, the clutches and the brakes are not actuated.

R range:

When the manual valve 42 is set in the R-range, the port 77 of the manual valve 42 connected to the line pressure passage 64 is communicated with the port 76, so that the line pressure is delivered to the passage 191. The passage 191 is connected to the 1 speed pressure-reducing valve 51 and the shuttle valve 56. A port 136 of the 1 speed pressure-reducing valve 51 receives only the line pressure from the passage 191. The spool 131 of the valve 51 is urged downwardly by a spring 132, so that the port 136 communicates with another port 135 thereof, for delivering the line pressure to another passage 192. Whereby, the low-and-reverse brake 9 is applied. On the other hand, the line pressure applied to the shuttle valve 56 proceeds into another passage 193, which is then applied to the front clutch 4. Whereby, the front clutch 4 is engaged. As a result, the conditions for the reverse operation are established.

The line pressure for the reverse operation is so regulated that there is a balance among a downwardly directed force due to the oil pressure acting on the differential area between the lands 65a and 65b at the port 68 of the regulator valve 43, an upwardly directed force due to the throttle pressure applied to the differential area between the lands 65e and 65f at the port 73, and another upwardly directed force of the spring 66.

N-range:

When the manual valve is set in the N-range, the port 77 of the valve is blocked, as in the case of the P-range. Thus, no brakes or clutches are operated and the neutral state is maintained.

D-range:

When the manual valve 42 is set in the D-range, the port 77 of the valve 42 communicates with port 78 to establish the line pressure at passage 180. Since passage 180 is connected to the rear clutch 5, the rear clutch 5 is engaged. The passage 180 is also connected to a port 94 of the 1–2 shift valve 45. In the line 1–2 shift valve 45, the throttle pressure from a passage 195 is applied to a differential area between the lands 88a and 88b of a spool 88 And to another differential area between the lands 88b and 88c, through the shuttle valve 54 to provide a downwardly directed force thereto, together with a spring 89. In this case, the amplified governor pressure is applied to another port 99 of the 1–2 shift valve 45, to cause an upwardly directed force to act on a land 88e of the spool 88. When the car speed is comparatively low and the amplified governor pressure is low, the upwardly directed force is weak and the spool 88 of the 1–2 shift valve 45 is urged downward by the combination of the throttle pressure force and the spring force. Thus, the port 94 of the 1–2 shift valve 45 is blocked by the land 88c of the spool 88. Accordingly, if the car speed is low, only the rear clutch 5 is engaged. Thus, the $D_1$ range is established, wherein the engine brake is not effective.

When the car speed increases and the amplified governor pressure becomes high, the upwardly directed force acting on the land 88e of the spool 88 of the 1–2 shift valve 45 will surpass the combination of the downwardly directed forces due to the throttle pressure and the spring 89. Thus, the spool 88 is gradually raised. When the spool 88 comes up to a position where the port 93 is blocked by the land 88c, the throttle pressure formerly acting on the differential area between the lands 88b and 88c is now drained through the port 92. Thus, the downwardly directed force is weakened, to quicken the upward movement of the spool 88. The ports 94 and 95 of the 1–2 shift valve 45 then communicate so that the oil pressure from the passage 180 is applied to the passage 194 and the second driving brake 11 is applied. Thus, the $D_2$ range is established. When the spool 88 of the 1–2 shift valve 45 is urged to its uppermost position, the downwardly directed force acting thereon becomes the sum of the force due to the throttle pressure applied to the differential area between the lands 88a and 88b and the spring force. As compared with the force necessary for pushing up the spool 88, the amplified governor pressure which is necessary for pushing the spool down can be reduced by an amount corresponding to the throttle pressure acting on the differential area between the lands 88b and 88c. Thus, as compared with the upshift from the first speed range to the second speed range, the downshift from the second speed range to the first speed range will be effected at a lower car speed.

When the line pressure is applied to the passage 194 with the ports 94 and 95 of the 1–2 shift valve communicated, this line pressure is also applied to the port 109 of the 2–3 shift valve 46. A port 105 of the shift valve 46 receives the throttle pressure through the shuttle valve 55 and passages 186 and 196, which throttle pressure acts on the differential area between lands 100c and 100b of the spool 100 of the valve 46 for urging the spool 100 downwardly. A regulated pressure from the hysteresis valve 53 (to be referred to as the "hysteresis pressure," hereinafter) is applied to a port 106 of the 2–3 shift valve 46 through a passage 197, so as to act on a differential area between lands 100d and 100c of the spool 100 of the valve 46, for urging the spool 100 downwardly together with a spring 101. The amplified governor pressure applied to a port 112 of the valve 46 acts to urge the spool 100 upwardly. When the car speed is comparatively low, the amplified governor pressure is also low, and the upwardly urging force is small enough to keep the spool 100 urged to its lowermost position. Under such conditions, the line pressure from the passage 194 is transmitted to the passage 198 through the ports 109 and 108 of the valve 46. The passage 198 is connected to a port 141 of the 2 speed pressure-reducing valve 52, but the port 141 is blocked by the land 139a of the spool 139 in the D-range because spring 145 forces the spool 139 downwardly. As the car speed further increases, the amplifier governor pressure also becomes higher, so as to gradually move the spool 100 upwardly. As soon as the land 100d blocks the port 106, the port 105 communicates with the port 199. The hysteresis pressure which has acted on the differential area between the lands 100d and 100c is now replaced with the throttle pressure because the spool 100 thus raised communicates the port 105 with the port 199. In this case the hysteresis pressure is higher than the throttle pressure, so that the replacement of the hysteresis pressure with the throttle pressure results in a reduction of the downwardly directed force by an amount corresponding to the difference between the hysteresis pressure and the throttle pressure. Consequently, the spool 100 of the 2–3 shift valve 46 is quickly pushed up. As a result, the path from the port 109 to the port 108 is switched to another path from the port 109 to another port 110. The oil pressure at the passage 198 is drained to the drain port 107. The pressure at the port 110 is applied to a passage 200, so as to apply the third driving brake 12. Thus, the conditions for the $D_3$ and 3 ranges are established. Once the spool 100 of the 2–3 shift valve 46 is pushed up, the downwardly directed force acting on the spool 100 is reduced by the amount corresponding to the difference between the hysteresis pressure and the throttle pressure, so that the downshift from the third speed to the second speed takes place at a lower amplified governor pressure, i.e., at a lower car speed, as compared with those for the upshift from the second speed to the third speed.

The passage 200 connected to the port 110 of the 2–3 shift valve 46 is connected to a port 119 of the 3–4 shift valve 47. The 3–4 shift valve 47 has ports 116 and 117 which are communicated with each other and provided with the throttle pressure via the passage 295, shuttle valve 57 and passage 186, connected to the throttle valve 44. The passage 197 applies the hysteresis pressure to a port 118 of the valve 47. The throttle pressure acts on a differential area between lands 113b and 113a of a spool 113 of the valve 47, and the hysteresis pressure acts on another differential area between lands 113c and 113b of the spool 113, and both the throttle and hystereis pressures act to urge the spool 113 downwardly together with a spring 114. The amplified governor pressure delivered to a port 122 of the valve 47 acts to urge the spool 113 upwardly, so that there will be a balance between this upwardly directed force and a combined downwardly directed force of the aforesaid causes. As long as the car speed is in short of a certain predetermined level, the spool 113 of the 3–4 shift valve 47 is kept at its lowermost position and the port 119 of the valve 47 communicates with a port 322 connected to a passage 321. The passage 321 is connected to a port 314 of the 3 speed pressure-reducing valve 330. In the D-range, a spool 310 of the 3 speed pressure-reducing valve 330 is urged to its lower position by a spring 316, so that the port 314 is blocked by a land 310b of the spool. As the car speed increases, the spool 113 is gradually raised, as in the case of the 2–3 shift valve 46, and port 119 is communicated with port 120 at a certain point as shown in FIG. 5b. The port 120 is communicated with the shuttle valve 56 through a passage 201, which, in turn, is connected to the front clutch 4 through the passage 193. Accordingly, when the 3–4 shift valve spool 113 is raised to such a position as to communicate the ports 119 and 120 of the valve 47, the passage 201 is communicated with the passage 200 and provided with the line pressure. As a result, the front clutch 4 is engaged, to establish the conditions for the fourth speed, or the $D_4$ range. The 4–3 downshift will take place at a lower car speed, as compared with that for the 3–4 upshift, due to similar reasons.

D-range kickdown:

In the D-range operation, when the accelerator pedal is fully depressed to close kickdown switch 36, the shift point will be raised in the following manner. With the kickdown switch open, the plunger 203 of a solenoid 160 is forced to engage in an orifice 204 by an inner spring of the solenoid 160. The solenoid valve 49 has a port 156 which communicates with the line pressure passage 64 through an orifice 205, and the line pressure acts on the port 156 when the orifice 204 is blocked by the plunger 203, in order to force a spool 155 downwardly against a spring 206. Under such conditions, the port 157 of the valve 49 is blocked by a land 155a of the spool 155, and a port 158 is drained to a drain port 159. When the kickdown switch 36 is closed, the plunger 203 or the solenoid 160 is pulled up, to allow the draining of the line pressure at the port 156 through the orifice 204. Thus, the spool 155 is pushed up by the spring 206. At the same time, the port 157 communicates with the port 158, so that the line pressure from the port 158 is applied to the idle valve 50 through the passage 207. At this moment, the port 167 of the idle valve 50 is provided with the throttle pressure which is applied thereto through the passage 186, the shuttle valve 57, and the passage 185. When the accelerator pedal is depressed as to close the kickdown switch 36, the throttle pressure is so high that the upwardly directed force acting on the land 161c of the spool 161 of the idle valve 50 overcomes the elasticity of the spring 168 and pushes the spool 161 upwardly. Thus, the port 164 communicates with the port 163, so as to deliver the oil pressure from the passage 207 to the passage 202 leading to the downshift valve 48. When the oil pressure is applied to the passage 202 as described above, the oil pressure acts on the port 125 of the downshift valve 48 for urging the spool 123 thereof downwardly, so as to switch the oil pressure acting on the port 127, i.e., the pressure at the passage 208, from the amplified governor pressure to the fundamental governor pressure. For a given car speed, the fundamental governor pressure is lower than the amplified governor pressure, so that the shift point is raised for both the upshift and the downshift. This is the kickdown mechanism. The line pressure system for the kickdown operation is the same as for the normal D-range.

D-range idling state:

The solenoid 160 of the solenoid valve 49 is adapted to be turned on not only at the kickdown but also at the engine idling. Accordingly, if the accelerator pedal is released while cruising at D-range, switch 36 is closed and the solenoid 160 is energized to withdraw plunger 203 from orifice 204. As in the case of the kickdown, the port 158 and the passage 207 leading to the idle valve 50 are provided with oil pressure. Up to this point, the operation is the same as that of the kickdown.

During the idling, the throttle pressure at the port 167 of the idle valve 50 is slow. Accordingly, the spool 161 of the valve 50 is kept at the lowermost position by the spring 168, and the port 164 communicates with the port 165. Accordingly, the line pressure is applied to the passage 184 through the solenoid valve and the passage 207. Since the passage 184 is at the line pressure, it is always higher than the oil pressure at the passage 208 from the downshift valve 48 (amplified governor pressure or the fundamental governor pressure). Accordingly, the line pressure is delivered to the passage 209 through the shuttle valve 58, regardless of the relative manitudes of the two governor pressures. The passage 209 leads to the port 99 of the 1–2 shift valve 45, the port 112 of the 2–3 shift valve 46, and the port 122 of the 3–4 shift valve 47. As a result, the spools 88, 100 and 113 of the shift valves 45, 46 and 47 are pushed up, so as to achieve the conditions for the fourth speed of $D_4$ range. Thus, when the foot leaves the accelerator pedal, the solenoid 160 is turned on, so as to establish a path through the solenoid valve 49, the idle valve 50, and the shuttle valve 58. The line pressure from the hydraulic system is applied to the shift valves 45, 46 and 47 for bringing the automatic transmission to the fourth speed range without failure.

With conventional cars, when the car is stopped, the automatic transmission is at the first speed range where the driving torque is high, so that the car starts to move even during the idling state when the brakes are released (i.e., what is referred to as the creep phenomenon.)

When a car equipped with the automatic transmission of the present invention is idling, the transmission is at the fourth speed range, so that there will be no torque amplification due to the gear ratio, and the creep phenomenon is eliminated.

When the accelerator pedal is depressed in order to start from the idling state, the solenoid 160 is immediately de-energized, so that the port 158 of the solenoid valve 49 is communicated with the drain port 159. Thus, the oil pressure is drained, and the spools 88, 100, and 113 of the shift valves are forced downwardly by the springs 89, 101, and 114, so that the first speed range or D₁ range is established for ensuring a strong acceleration. As regards the line pressure for this case, the passage 184 communicates with the port 69 of the regulator valve 43, for applying the oil pressure from the idle valve 50 to the differential area between the lands 65c and 65b of the spool 65 of the regulator valve 43, so as to cause a downwardly directed force acting on the spool 65. As a result, the line pressure under the control of the regulator valve 43 is reduced by that amount. Thus, under the idling state, the line pressure is lower than that for the normal D-range operation.

Such method is not used in any conventional hydraulic circuits, so that when the manual valve is shifted from the N-range to the D-range, the line pressure is retained at a high level for the normal D-range and an unpleasant shock is produced.

With the hydraulic circuit according to the present ivention, the line pressure during the idling state is reduced to the minimum necessary oil pressure, so that the unpleasant shock is diminished. Furthermore, as soon as the accelerator pedal is depressed, the solenoid is de-energized for draining the line pressure at the passage 184, so as to recover the oil pressure for the normal D-range. The oil pressure necessary for the start is applied to each clutch and to each brake for ensuring reliable engagement and application thereof.

3 range:

When the manual valve 42 is set the 3 range, in addition to the port 78, the port 79 is communicated with the line pressure from the port 77, so that the passage 181 is provided with the line pressure. The passage 181 leads to the port 115 of the 3–4 shift valve 47, a port 311 of the 3 speed pressure reducing valve 330, and to the shuttle valve 57. Since the line pressure at the line 181 is higher than the throttle pressure at the passage 186, the shuttle valve 57 acts to switch the pressure of the passage 185 from the throttle pressure to the line pressure.

As pointed out above, the passage 295 leads to the port 153 of the hysteresis valve 53, so that during the D-range, a pressure corresponding to the throttle pressure at the port 153 is applied to the passage 197. On the other hand, when the 3 range is selected, this throttle pressure is switched to the line pressure at the shuttle valve 57, so that the spool 146 of the hysteresis valve 53 is pushed up, to cause communication between the ports 150 and 151. As a result, the line pressure from the passage 64 is applied to the passage 197 and to the port 118 of the 3–4 shift valve 47 to which the passage 197 is connected. The passage 295 applies the line pressure to the ports 116 and 117 of the 3–4 shift valve 47. As pointed out above, the line pressure from the passage 181 is applied to the port 115 of the 3–4 shift valve 47. In effect, all the differential areas of the spool 113 of the 3–4 shift valve 47 are provided with downwardly directed forces, and the spool 113 of the 3–4 shift valve 47 is urged downwardly, regardless of the magnitude of the counteracting governor pressure.

Thus, when the manual valve 42 is shifted to the 3 range, the spool 113 of the 3–4 shift valve 47 is forced to its lowermost position regardless of the car speed. When the spool 113 of the 3–4 shift valve 47 is forced to the lowermost position, port 119 will communicate with port 322. Port 322 is connected to the port 314 of the 3 speed pressure-reducing valve 330 through the passage 321. On the other hand, the line pressure is applied to the port 311 of the 3 speed pressure-reducing valve 330 through the passage 320. Thus, the 3 speed pressure-reducing valve 330 becomes ready to regulate the oil pressure by using the drain port 312. The upwardly directed line pressure from the port 311 balances the combined downwardly directed force of the spring 316 and the oil pressure in the port 315. That is to say, the oil pressure in the port 315 is lower than the line pressure by an amount corresponding to the force of the spring 316. This oil pressure is delivered to the third coasting brake 301 through the passage 317 so that the 3 speed range is established in which engine braking can effectively be used. If the oil pressure at the passage 317 is too high, an unpleasant shifting shock will occur, while if the oil pressure is too low, the shift operation will take to much time and the engine brake cannot be used quickly.

With the hydraulic circuit according to the present invention, the oil pressure for the third coasting brake can be regulated by the 3 speed pressure-reducing valve 330. By modifying the strength of the spring 316, the oil pressure can be suitably regulated so as to provide a proper engine brake. The conditions for the 1–2 shift valve 45 and the 2–3 shift valve 46 are the same as those of the D-range, except that port 106 receives line pressure in the 3 range while receiving hysteresis pressure in the D-range. Since the line pressure is higher than the hysteresis pressure, the 2–3 shift point becomes higher as compared with that in the D-range. Otherwise, the conditions are the same as the D-range, and the automatic shifting between the 1st speed range, the second speed range, and the third speed range can be effected depending on the car speed and the engine load. The same kickdown operation as that for the D-range can be carried out.

In the D-range, the aforementioned creep phenomenon is prevented, but in the 3 range, the creep preventing function is inoperative. When the shuttle valve 57 is switched over to apply the line pressure to the passage 185, the line pressure is also applied to the port 167 of the idle valve 50 for pushing up the spool 161. Thus, the port 165 communicates with the port 166, to always drain the oil pressure of the passage 184 through the port 166. Accordingly, no oil pressure is present at the passage 184, regardless of whether the solenoid is on or off. Consequently, the creep preventing function is not actuated.

The creep prevention does not function in the 2 range and the 1 range, as in the case of the 3 range since it is desirable to use the engine as a brake in the 3, 2, and 1 ranges. Unless the creep preventing function is halted, as soon as the foot leaves the accelerator pedal during the 3, 2 and 1 range cruising, the transmission shifts to the fourth speed range, so that the engine cannot be used as a brake. When it is desired to positively use the creep phenomenon, as in the case of extremely slow running in congested downtown areas, the selection of the 3, 2, or 1 range will allow the driver to take advantage of the creep phenomenon.

The line pressure in the 3 range becomes higher than that in the D-range, because the line pressure from the passage 185 proceeds to the port 73 of the regulator valve 43 so as to act on the differential area between the lands 65e and 65f in a direction for raising the spool 65, or in a direction of assisting the spring. Furthermore, the effect of the throttle pressure is eliminated, so that it becomes a constant oil pressure regardless of the throttle pressure.

2 range:

When the manual valve 42 is set in the 2 range, in addition to the ports of 78 and 79 for the case of the 3 range, the line pressure is also applied to the port 80. Thus, the passage 182 receives the line pressure. Let it be assumed that the shift to the 2 range is effected while cruising at the 3 range, i.e., with the spool 100 of the 2–3 shift valve 46 kept raised. Then, the port 102 of the 2–3 shift valve 46 communicates with the passage 182, so that the line pressure is immediately applied thereto. The pressure applied to the port 105 through the shuttle valve 55 and the passage 196 is switched from the previous throttle pressure to the line pressure. Accordingly, as compared with the downshift in the case of the D-range, very quick downshift is effected regardless of the throttle pressure. When the spool 100 of the 2–3 shift valve 46 is urged to the lowermost position, the line pressure from the passage 182 is applied to the port 104, so that line pressure is applied to all the downwardly oriented differential areas of the spool 100, thereby firmly locking it in its lowermost position. As long as the manual valve 42 is at the 2 position, it will never be upshifted. When the spool 100 of the 2–3 shift valve 46 is forced to its lowermost position, the path from the port 109 to the port 110 will be switched to the other path from the port 109 to the port 108. The port 108 is connected to the port 141 of the 2 speed pressurereducing valve 52 through the passage 198. On the other hand, the line pressure is applied to the port 144 of the 2 speed pressure-reducing valve 52 through the passage 182. Thus, the 2 speed pressure-reducing valve 52 becomes ready to regulate the oil pressure by using the drain port 143. The upwardly directed line pressure from the port 144 balances the combined downwardly directed force of the spring 145 and the oil pressure in the port 140. That is to say, the oil pressure in the port 140 is lower than the line pressure by an amount corresponding to the force of the spring 145. This oil pressure is delivered to the second coasting brake 10 through the passage 210 so that the 2 speed range is established in which engine braking can effectively be used. At this moment, a shift shock may be experienced. If the oil pressure at the passage 210 is too high, the shock will become unpleasantly large, while if the oil pressure is too low, the shift operation will take too much time and the engine brake cannot be used quickly.

With the hydraulic circuit according to the present invention, the oil pressure supplied to the second coasting brake can be regulated by the 2 speed pressure-reducing valve 52. By modifying the strength of the spring 145, the oil pressure can be suitably regulated so as to provide a proper engine brake. In the 2 speed range, the automatic 1–2 shift is carried out in the same manner as the D-range. The creep preventing function is halted in the 2 speed range, just like in the 3 speed range.

When the shift to the 2 speed range takes place during the fourth speed range, the car speed is very high, and the force due to the upwardly directed governor pressure is very large and the spool 46 of the 2–3 shift valve 46 cannot be lowered immediately. It will be necessary to establish the third speed range at first, and after a certain speed reduction, the upwardly directed governor pressure will be reduced sufficiently for effecting the downshift. Thus, even if the shift to the 2 range is selected at a high car speed, engine over run will never occur.

1 range:

When the manual valve 42 is set in the 1 range, in addition to the ports 78, 79, and 80 for the case of the 2 speed range, the line pressure is also applied to the port 81. Thus, the line pressure is applied to the passage 183. Let it be assumed that the shift to the 1 range or position is effected in the second speed range cruising, i.e., with the spool 88 of the 1–2 shift valve 45 kept at the raised position. Then, the port 90 of the 1–2 shift valve 45 communicates with the passage 183, so that the line pressure is immediately applied thereto. The pressure at the port 91 from the shuttle valve 54 and the passage 195 is switched from throttle pressure to the line pressure. Accordingly, the spool 88 is very quickly forced downwardly. When the spool 88 of the 1–2 shift valve 45 is pushed down, the line pressure is delivered to the port 93 through the shuttle valve 54 and the passage 195, to act on the differential area between the lands 88c and 88d of the spool 88. The line pressure also enters the port 98 from the port 183, so that all the downwardly oriented differential areas of the spool 88 of the 1–2 shift valve 45 are supplied with the line pressure. Accordingly, as long as the manual valve 42 is kept at the 1 range or position, spool 88 of the 1–2 shift valve 45 is held down, and will never be automatically shifted upwardly.

When the spool 88 is pushed down, a path is formed from the port 98 to the port 97, and the line pressure reaches the passage 211. The passage 211 leads to the ports 137 and 134 of the 1 speed pressure-reducing valve 51. The port 136 of the 1 speed pressure-reducing valve 51 is drained to the port 76 of the manual valve 42 through the passage 191. Thus, the valve 51 functions as a pressure-regulating valve, in which the upwardly directed force due to the line pressure at the port 137 balances the combined downwardly directed force of the spring 132 and the oil pressure at the port 133. Thus, the oil pressure at the port 133 is regulated to be lower than the line pressure by an amount corresponding to the force of the spring 132. The thus regulated oil pressure acts to apply the low-and-reverse brake 9 through the passage 192, to establish the conditions for the first speed range in which the engine brake can be used.

As described in the foregoing, with the R-range, the ports 136 and 135 of the 1 speed pressure-reducing valve 51 are in communication, and the line pressure is applied to the passage 192 for applying the low-and-reverse brake 9, to establish the reverse conditions. Accordingly, the function of the 1 speed pressure-reducing valve 51 is to directly use the line pressure for the reverse range, while in the case of the 1st speed range, the line pressure is used only after reducing it. This is because the low-and-reverse brake 9 is subjected to a larger reaction torque in the reverse range than in the first speed range.

According to the present invention, when the shift to the first speed range is effected while cruising at the fourth speed range, the first speed range cannot be achieved immediately. This is to prevent engine over run. At high speed, the governor pressure is high, and the upwardly directed force acting on the 1–2 shift valve 45 is large, so that the spool 88 of the valve 45 is held at the raised position until the car is slowed down to a certain level, where the spool 88 can be pushed down. If the manual valve 42 is shifted to the 1 range while the car is cruising at the fourth speed range, the 3-4 shift valve 47 works first to slow down the car to the third speed range, and the 2-3 shift valve 46 then acts to slow down to the second speed range. The 1-2 shift valve 45 becomes effective to shift to the first speed range only after the car speed is reduced to a sufficiently low level. Once it is shifted down to the 1 speed range, it will never be automatically shifted up to the second or higher speed ranges. The creep preventing function is halted in the 1 speed range, just as in the 3 and 2 speed ranges. The line pressure is controlled in a manner similar to that in the case of the 2 and 3 speed ranges.

As described in the foregoing disclosure, in addition to a regulator valve for controlling the line pressure to be applied to friction elements, a hysteresis valve is used for further effecting the pressure control based on the throttle pressure and other signal. The hysteresis valve compares the line pressure and the throttle pressure, and generates a hysteresis pressure, which is applied to the differential area of a shift valve. Whereby, a hysteresis is caused in which the upshift is effected only when the governor pressure is higher than that for causing the downshift, while the downshift is effected only when the governor pressure is lower than that for causing the upshift. Thus, the shifting action of the shift valve is actuated not by the easily variable unstable line pressure, but by a controllable pressure by which any desired hysteresis can be maintained. Thereby, the fluctuation of the shift point is eliminated.

What is claimed is:

1. In a hydraulic control circuit for a vehicle automatic transmission of the type wherein a plurality of shift control valves selectively deliver hydraulic fluid to a plurality of frictional elements to cause engagement and disengagement of said frictional elements having a first pressure regulating means and a throttle valve responsive to the vehicle engine load interposed between a main supply pump and the shift control valves, the improvements comprising: a second pressure regulating means interposed between the first pressure regulating means and at least one shift control valve and means to control the second pressure regulating means independently of the first pressure regulating means.

2. The improved hydraulic control circuit of claim 1 wherein the means to control said second pressure regulating means causes the output pressure of the second pressure regulating means to vary in direct proportion to the output of the throttle valve.

3. The improved hydraulic control circuit of claim 1 wherein the means to control said second pressure regulating means causes the output pressure of the second pressure regulating means to increase at a diminishing rate as the vehicle throttle opens.

4. The improved hydraulic control circuit of claim 1 wherein the means to control said second pressure regulating means causes the output pressure of the second pressure regulating means to increase at an increasing rate as the vehicle throttle opens.

5. The improved hydraulic control circuit of claim 1 wherein the second pressure regulating means comprises a valve.

6. The improved hydraulic control circuit of claim 5 wherein the second pressure regulating valve is of the spool type.

7. The improved hydraulic control circuit of claim 1 wherein the second pressure regulating means regulates the pressure supplied to the at least one shift control valve only when a manual gear selection valve is in a position which permits the transmission to automatically shift into its highest forward gear.

8. The improved hydraulic control circuit of claim 7 wherein the pressure from the second pressure regulating means is the same pressure as the pressure regulated by the first presssure regulating means when a manual gear selection valve is in a position which prohibits the transmission from automatically shifting into its highest forward gear.

* * * * *